United States Patent
Hunt et al.

(10) Patent No.: US 12,510,255 B2
(45) Date of Patent: Dec. 30, 2025

(54) SYSTEM AND METHOD FOR HYDRONIC DISTRIBUTION WITH SUBMERSIBLE PUMPS IN AN UNPRESSURIZED TANK

(71) Applicant: HUNT UTILITIES GROUP LLC, Pine River, MN (US)

(72) Inventors: Paul C. Hunt, Pine River, MN (US); Ryan P. Hunt, Pine River, MN (US); Simon H. Goble, Backus, MN (US); Jacob I. Brower, Pine River, MN (US)

(73) Assignee: HUNT UTILITIES GROUP LLC, Pine River, MN (US)

( * ) Notice: Subject to any disclaimer, the term of this patent is extended or adjusted under 35 U.S.C. 154(b) by 335 days.

(21) Appl. No.: 18/017,348

(22) PCT Filed: Aug. 13, 2021

(86) PCT No.: PCT/US2021/045983
§ 371 (c)(1),
(2) Date: Jan. 20, 2023

(87) PCT Pub. No.: WO2022/040047
PCT Pub. Date: Feb. 24, 2022

(65) Prior Publication Data
US 2023/0204223 A1    Jun. 29, 2023

Related U.S. Application Data

(60) Provisional application No. 63/066,657, filed on Aug. 17, 2020.

(51) Int. Cl.
F24D 11/00     (2022.01)
F24D 19/10     (2006.01)
F24H 1/18      (2022.01)
G05B 19/416    (2006.01)

(52) U.S. Cl.
CPC ........ *F24D 11/002* (2013.01); *F24D 19/1012* (2013.01); *F24H 1/181* (2013.01); *G05B 19/416* (2013.01); *G05B 2219/37371* (2013.01)

(58) Field of Classification Search
CPC .. F24D 11/002; F24D 19/1012; F24D 11/003; F24D 11/004; F24D 11/005; F24D 12/02; F24D 19/1009; F24D 2220/042; F24D 2220/048; F24H 1/181; F24H 15/223; F24H 15/248; F24H 15/34; G05B 19/416; G05B 2219/37371; Y02E 60/14
See application file for complete search history.

(56) References Cited

U.S. PATENT DOCUMENTS

| | | |
|---|---|---|
| 4,375,831 A | 3/1983 | Downing, Jr. |
| 5,305,614 A | 4/1994 | Gilles |
| 5,802,864 A | 9/1998 | Yarbrough et al. |

(Continued)

OTHER PUBLICATIONS

PCT ISR & WO PCT Ser. No. PCTUS2021045983, Nov. 22, 2021.

*Primary Examiner* — Kidest Worku
(74) *Attorney, Agent, or Firm* — Carlos R. Villamar; The Villamar Firm PLLC (57) ABSTRACT

A heat distribution system, method and computer program product, including an unpressurized tank configured for holding a heat transfer fluid; and one or more submersible heat transfer fluid pumps configured to pump the heat transfer fluid to one or more heat load loops respectively connected to the one or more heat transfer fluid pumps.

17 Claims, 7 Drawing Sheets

(56) References Cited

U.S. PATENT DOCUMENTS

| | | |
|---|---|---|
| 5,806,331 A | 9/1998 | Brown |
| 10,303,191 B2 * | 5/2019 | Haigh .................. G11B 33/142 |
| 2015/0345873 A1 | 12/2015 | Sasakura et al. |
| 2016/0047555 A1 * | 2/2016 | Lutfey .................. F24S 10/753 |
| | | 126/621 |
| 2016/0123629 A1 | 5/2016 | Song |
| 2016/0245565 A1 * | 8/2016 | Mortz .................... B23P 19/00 |

* cited by examiner

FIG. 7

SYSTEM AND METHOD FOR HYDRONIC DISTRIBUTION WITH SUBMERSIBLE PUMPS IN AN UNPRESSURIZED TANK

CROSS REFERENCE TO RELATED DOCUMENTS

The present disclosure claims priority to U.S. Provisional Patent Application Ser. No. 63/066,657 of Paul C. HUNT et al., entitled "SYSTEM AND METHOD FOR HYDRONIC DISTRIBUTION WITH SUBMERSIBLE PUMPS IN AN UNPRESSURIZED TANK," filed on 17 Aug. 2020, the entire disclosure of which is hereby incorporated by reference herein.

BACKGROUND OF THE DISCLOSURE

Field of the Invention

The present disclosure generally relates to hydronic systems and methods, and more particularly to a system and method for hydronic distribution employing submersible pumps, and the like, in an unpressurized tank, and the like.

Discussion of the Background

Hydronic systems and methods (e.g., cooling or heating systems in which heat is transported using circulating water) have been around a long time. Hydronic systems are closed loop, pressurized systems that accommodate a range of fluid pressures and temperatures, allow for filling and draining, allow for air bubble removal, and not leak from the many, many plumbing joints required. Typical components of such systems can include circulator pump(s), expansion tank, safety pressure relief valve, bubble remover, fill valve, drain valve, zone valves, a control system, and many, many plumbing joints. Accordingly, such systems are complicated to assemble, not easily modifiable to integrate new heat sources, complicated and expensive to repair, and almost always require a professional to work on them.

SUMMARY OF THE INVENTION

Therefore, there is a need for a method and system that addresses the above and other problems. The above and other problems are addressed by the illustrative embodiments of the present disclosure, which provide a system and method for hydronic distribution employing submersible pumps, and the like, in an unpressurized tank, and the like. Advantageously, the systems and methods described herein provide a hydronic heat distribution that serves to distribute heat from multiple sources, is flexible to configure, is inherently safer, and easier to maintain and repair.

Accordingly, in illustrative aspects of the present disclosure there is provided a heat distribution system, method and computer program product including an unpressurized tank configured for holding a heat transfer fluid; and one or more submersible heat transfer fluid pumps configured to pump the heat transfer fluid to one or more heat load loops respectively connected to the one or more heat transfer fluid pumps.

The heat distribution system, method and computer program product can further include control logic configured to control the one or more heat transfer fluid pumps based on programmable parameters.

The programmable parameters include at least one of speed control of the one or more heat transfer fluid pumps, on off operation of the one or more heat transfer fluid pumps based on a temperature of the heat transfer fluid, and on off operation of the one or more heat transfer fluid pumps based on respective thermostat input.

The heat distribution system, method and computer program product can further include mechanisms to limit evaporation of the heat transfer fluid, including at least one of a tank lid, water tight gaskets and fittings, and a low vapor oil layer over the heat transfer fluid.

The tank is partitioned to have a first section for receiving return flow of the heat transfer fluid from the one or more heat load loops, and a second section for transferring the return flow of the heat transfer fluid to the one or more heat transfer fluid pumps.

The heat distribution system, method and computer program product can further include one or more partitions in the tank configured to ensure that return flow of the heat transfer fluid from the one or more heat load loops is mixed with the heat transfer fluid returning from a heat source before being available for the heat transfer fluid pumps configured to pump the heat transfer fluid to one or more heat load loops.

The heat distribution system, method and computer program product can further include a submersible heating element or heat exchanger disposed with the tank.

The one or more heat transfer fluid pumps, and the control logic are hand replaceable.

Still other aspects, features, and advantages of the present disclosure are readily apparent from the following detailed description, by illustrating a number of illustrative embodiments and implementations, including the best mode contemplated for carrying out the present disclosure. The present disclosure is also capable of other and different embodiments, and its several details can be modified in various respects, all without departing from the spirit and scope of the present disclosure. Accordingly, the drawings and descriptions are to be regarded as illustrative in nature, and not as restrictive.

BRIEF DESCRIPTION OF THE DRAWINGS

The embodiments of the present disclosure are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
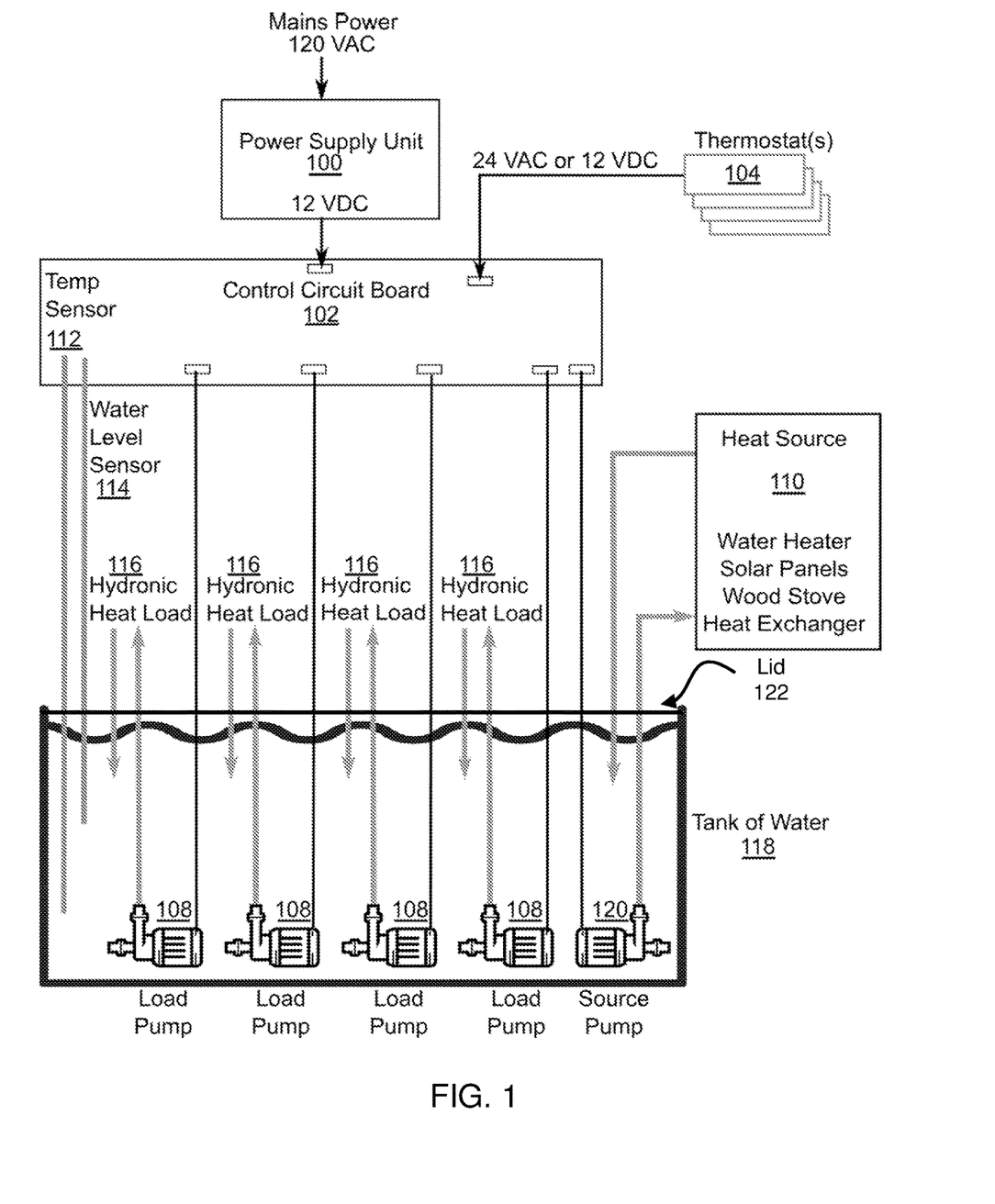
FIG. 1 is an illustrative block diagram of components of a hydronic system.

Referring now to the drawings, wherein like reference numerals designate identical or corresponding parts throughout the several views, and more particularly to FIG. 1 thereof, there is shown an illustrative block diagram of components of a hydronic system. In FIG. 1, the system can include any suitable power supply unit 100 (e.g., 120 VAC/240 VAC inputs, low voltage 6-20 VDC or VAC outputs, etc.) powering a control board 102, one or more conventional thermostats or other control signals 104 that connect to the control board 102, one or more pumps 108 to circulate the water to heat loads, one or more heat sources 110, one or more pumps 120 to circulate water to the heat sources 120, a tank temperature sensor or sensors 112, a tank water level sensor or sensors 114, one or more hydronic loops 116, one or more unpressurized tanks 118 of heat transfer fluid. The heat transfer fluid can be water, any suitable fluid, and the like, that is pumpable and can be used to transfer heat, and the like.

In buildings with radiant floor heating systems, the unpressurized water tank 118 that is open to the atmospheric pressure as the main hydronic reservoir is advantageously employed. The open tank 118, advantageously, serves as an expansion tank, bubble remover, pressure relief valve, and the like. Advantageously, filling is achieved simply by pouring any suitable heat transfer fluid (e.g., water, water with additives, water with an oil layer, etc.) into the top of the tank 118, the fluid can be easily drained through a drain valve (not shown), and the tank 118 is also inherently safe from building up steam pressure, and the like.

The present disclosure includes recognition that typical hydronic circulating pumps require several feet of head pressure for operation. Accordingly, a submersible pump that requires almost no head pressure can be advantageously employed for the relatively shallow, unpressurized reservoir tank 118. Thus, the technology available in inexpensive submersible pumps that can last a long time and handle boiling water temperature, and the like, are advantageously employed.

Figure 3:
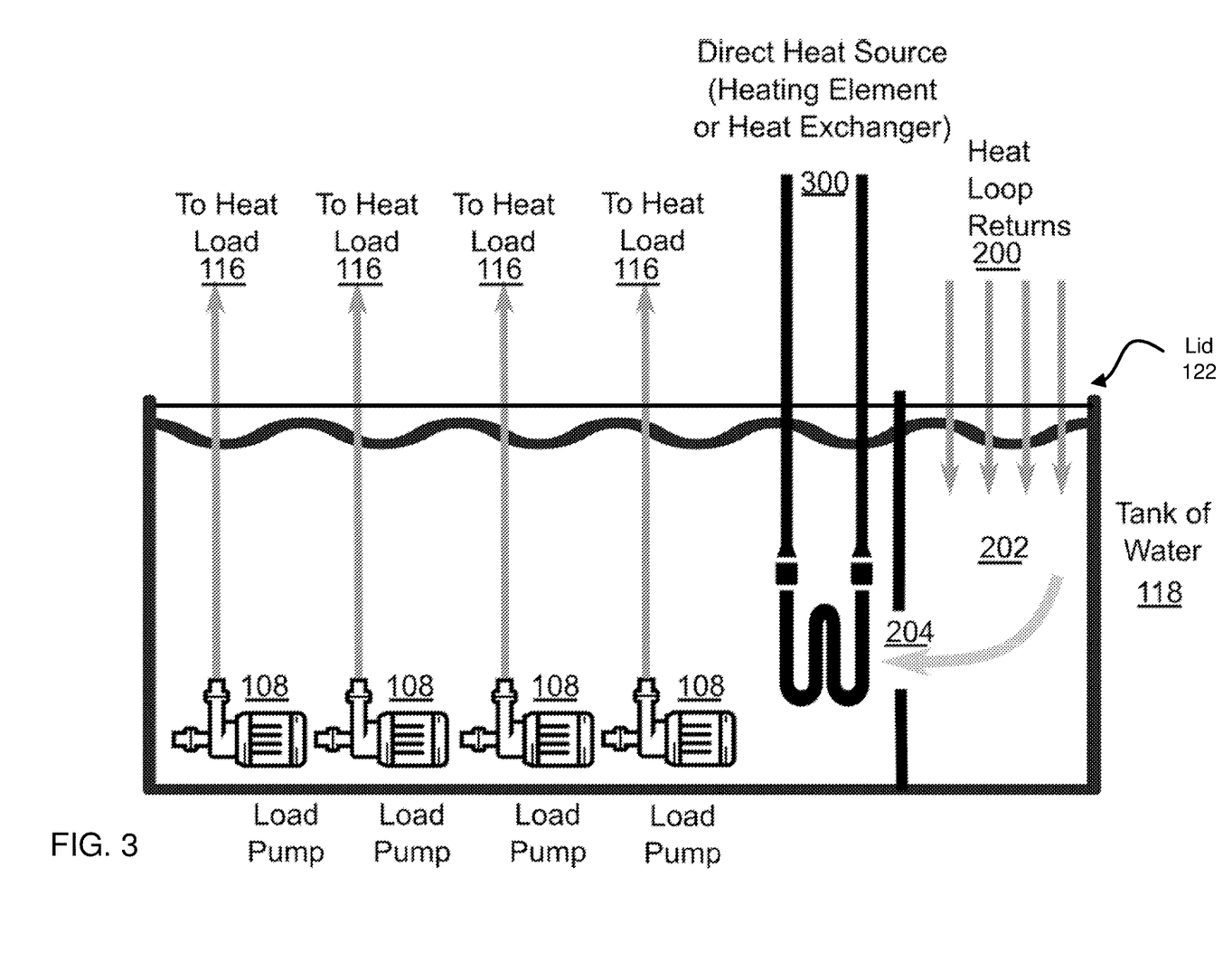
FIG. 3 is illustrative of a further refinement of a submersible heater or heat exchanger.

Heat is brought into the tank 118 when water from the tank 118 is pumped through the heat source 110 and returned to the tank 118 at a higher temperature. One or more the pumps 120 can be employed to make use of the multiple heat sources 110. Such hydronic system can, thus, advantageously, integrate heat from any suitable combination of electric water heaters, gas water heaters, wood boiler, solar panels, the cooling system for an internal combustion engine, any other suitable heat source that can heat water, and the like. Alternatively, the heat can be added into the tank 118 directly using a submersible electric heater or heat exchanger 300, as shown in FIG. 3.

The pipe loops that transfer heat from the tank 118 to the building serve as heat loads or heat loops 116. Advantageously, one heat load 118 can be connected for each of the pumps 108 for maximum flexibility, redundancy, simplicity, and the like. Any other suitable pump and heat load configurations can be employed. The control system 102 receives signal inputs, such as from the thermostats 104 for various heating zones or functions, and the like, and maps them to the respective pumps 108 for operation based on the respective signals, advantageously, eliminating a need for zone valves, and the like, and makes it easy to add or modify zones, and the like, without a need for changing plumbing, and the like.

The pump 108 array, advantageously, for example, can be powered for safety reasons by a low voltage (e.g., 6-12 VDC or VAC, etc.), which is inherently safer than other systems with pumps running at mains power (e.g., 120 VAC in the US, and other high voltage regional mains voltages, etc.), and the like. Such safety measures are particularly advantageous when reaching into the tank 118 to replace or repair one of the pumps 108 and/or 120. While water is the working fluid for most hydronic systems, advantageously, any other suitable heat transfer fluids can be employed for a given a range of applicable temperatures, and the like. Similarly, the water can include advantageous additives, for example, such as antifreeze or conditioners for anti-corrosion, and the like.

Water in the system will tend to evaporate over time if open to the atmosphere. Advantageously, the tank 118 can be covered with a suitable lid 122, and penetrations can be fitted with gaskets, seals, and the like, to retain the water vapor. Advantageously, such feature can also be accomplished or enhanced with any suitable low vapor heat transfer fluids, and the like or deploying oil on top of the water, and the like. Any suitable gaskets and seals can be employed that allow for the prevention of pressure build up in the tank for safety reasons, and the like.

Because the water will, inevitably, evaporate over time, or leaks may develop in the pipes outside the tank, the sensor 114 for sensing the water level is advantageously employed to protect the pumps 108 and 120 from running dry, and the like. The control system 102 then automatically turns off the pumps 108 and 120 if the water level gets too low, and can control pumping speed, and the like. The control system 102 also advantageously controls the maximum temperature of the working fluid in the tank 118 for various reasons, including, for example, the pumps 108 and 120 and tank 118 materials having a maximum temperature rating, in some heating applications, such as a radiant floor system, if the fluid is too hot, the floor may become uncomfortable in places, or possibly even dangerously hot before the thermostat 104 can control the temperature, for the safety of anyone opening the lid when the tank 118 is heated, and the like.

Figure 2:
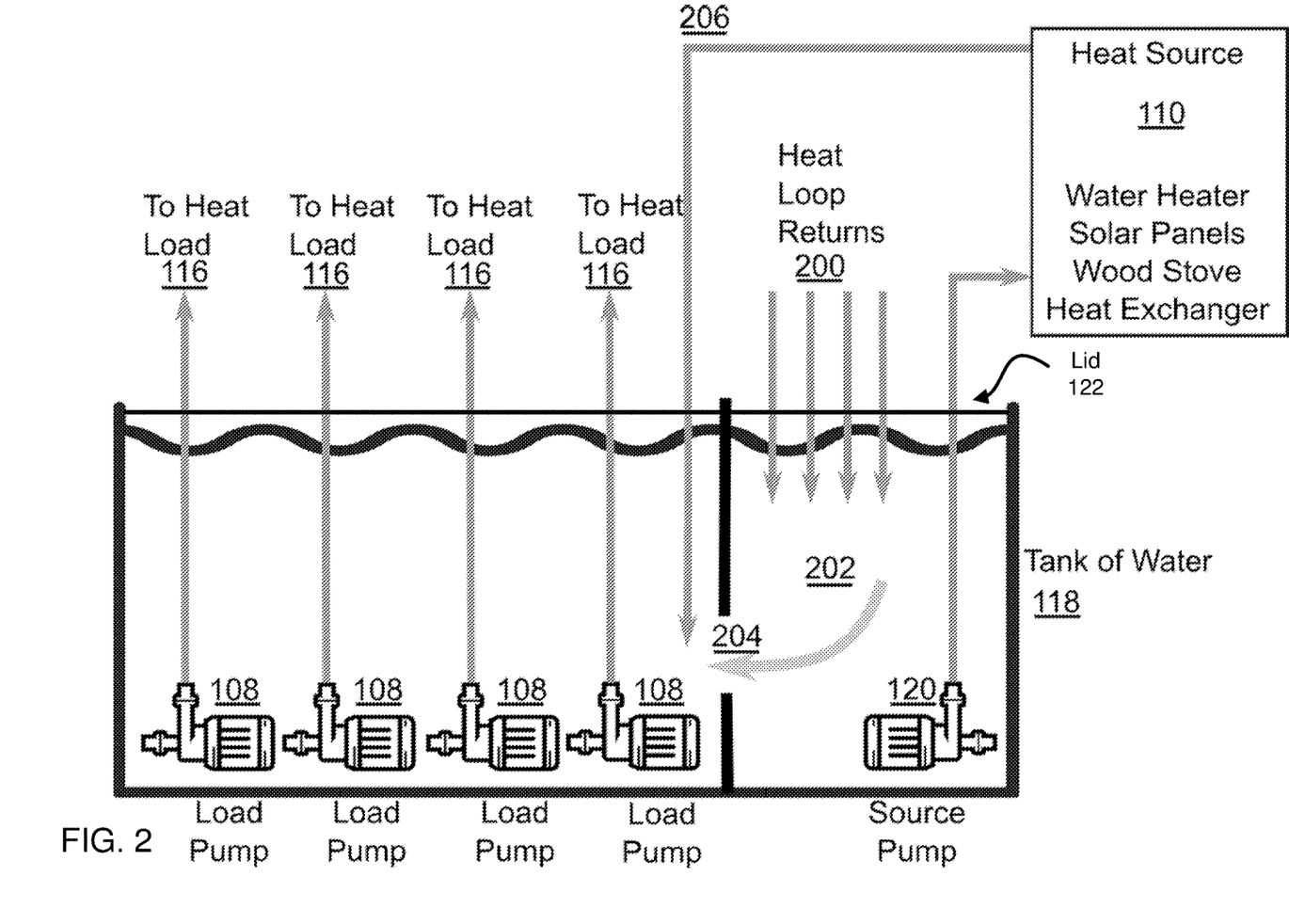
FIG. 2 is illustrative of a refinement in flow of heat transfer fluid to enhance temperature management.

FIG. 2 is illustrative of a refinement in flow of heat transfer fluid to enhance temperature management. In FIG. 2, a refinement on the basic concept of FIG. 1 is employed, wherein the water returning from the hydronic loops is cooler after transferring heat to the building. In order to prevent this cooler water from shortcutting to the intake of one of the pumps 108, advantageously, heat load return lines 200 can be returned into a part of the tank 118 that is sectioned off at section 202 before returning in one better mixed flow through barrier 204 to the main part of the tank 118 from which the heat load pumps 108 draw their water. A heat source pump 120 is located to draw the cooler water in the section 202 to be pumped through the heat source 110. This is advantageous because the cooler water can accept more heat per water flow rate. The heated water flow 206 is added to the mixed flow at 204 before the load pumps 108 draw it in.

FIG. 3 is illustrative of a further refinement of a submersible heater or heat exchanger. In FIG. 3, a submersible heating element or heat exchanger 300 can be advantageously employed in the tank 118 to serve as a heat source. The heating element 300 can be placed so as to add heat to the unified flow 204 before the heat load pumps 108 draw it in.

Figure 4:
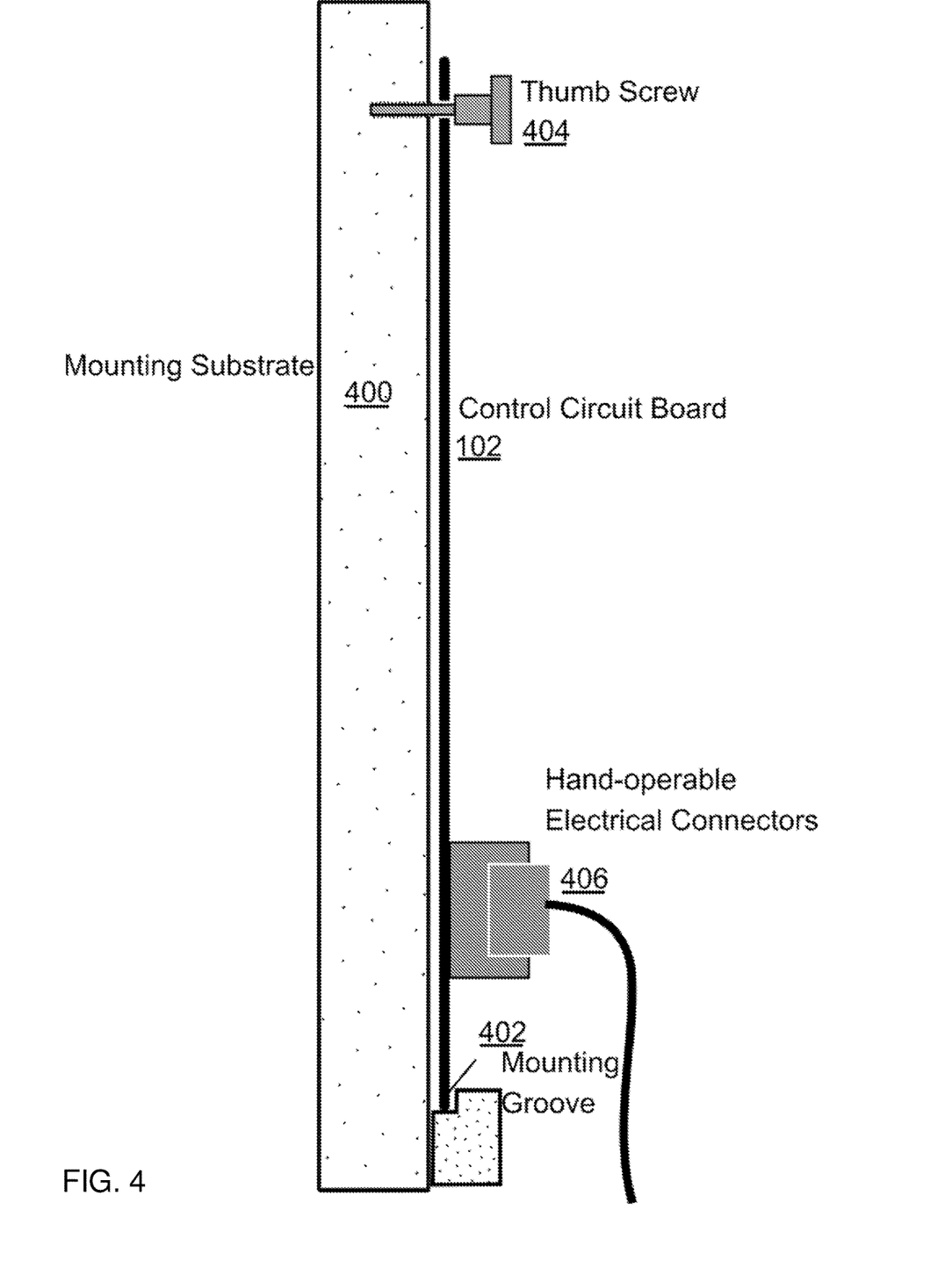
FIG. 4 is illustrative of preferred mechanisms for achieving a hand removable control board.

FIG. 4 is illustrative of preferred mechanisms for achieving a hand removable (e.g., toolless) control board. In FIG. 4, the control board 102 is advantageously installed in a manner to allow it to be removed, unplugged, and replaced, without the use of tools, and the like. For example, the control board 102 can be mounted on any suitable substrate 400, and the like. The control board 102 is held in place with thumb screws 404 on the top and a groove 402 for the bottom of the board 102 to rest. Any other suitable methods of fastening the board 102 in place in a way that are operable with bare hands can be employed, for example, including grooves, snaps, hooks, squeezable latches, pins, magnets, and the like. Electrical connections from the control board 102 are made with plugs or other hand operable connectors 406, and the like.

Figure 5:
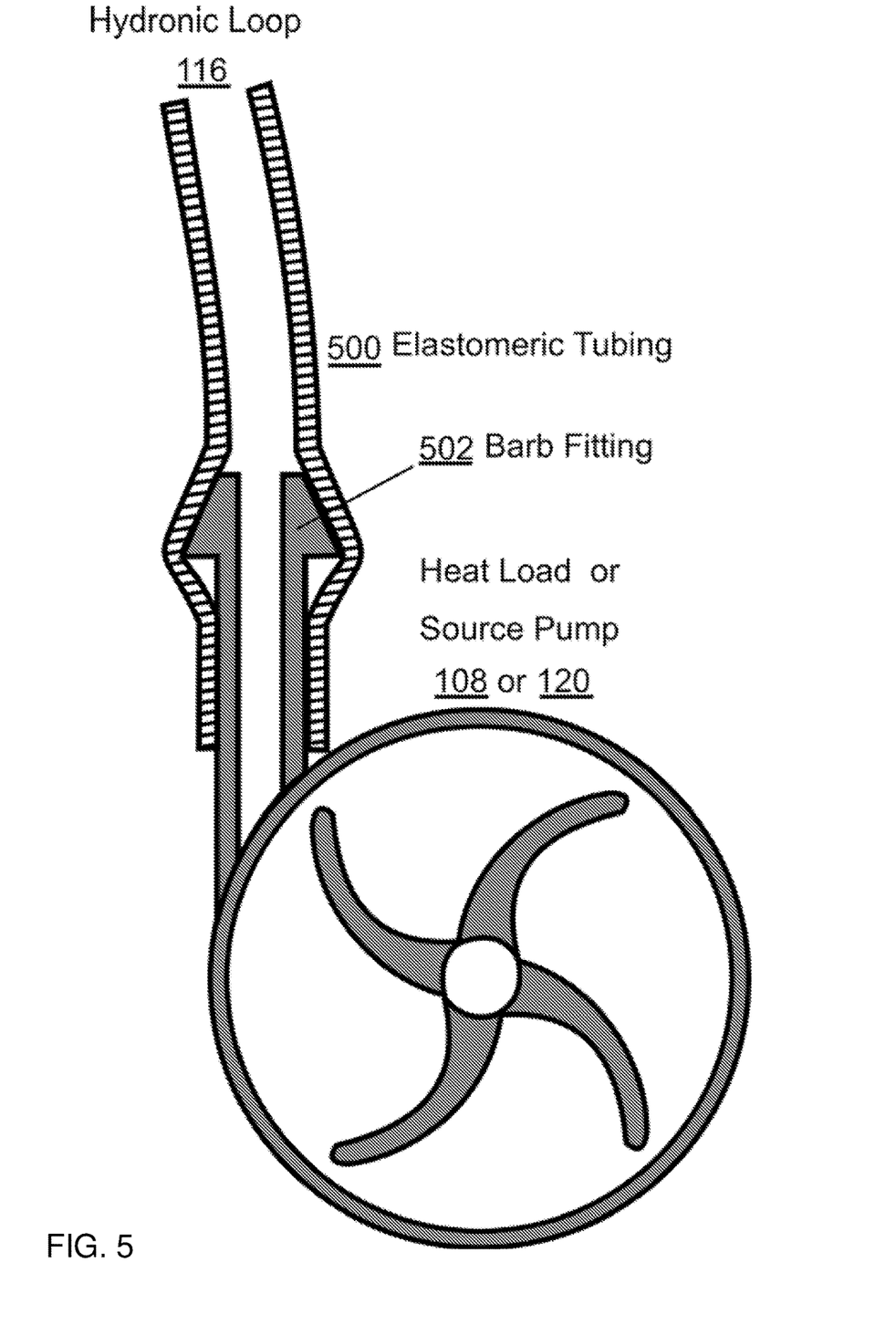
FIG. 5 is illustrative of preferred mechanisms for achieving a hand replaceable hydronic pump.

FIG. 5 is illustrative of preferred mechanisms for achieving a hand replaceable hydronic pump. In FIG. 5, a bare hand serviceable connection (e.g., toolless) for the pumps 108 and 120 can be advantageously employed, including the electrical plugs 406 that attach to the control unit 102 without the use of tools. For example, elastic silicone tubing 500 can be used to connect the pumps 108 to the hydronic loops 116 that carry heat around the building or the pump 120, and the like. Advantageously, the elastomeric tubing 500 can be pushed onto a barbed fitting 502 on each of the pumps 108 and 120 without the use of tools. Together with a removable tank cover large enough to easily reach the pumps with bare hands, advantageously, the pumps 108 and 120 can be easily replaced by hand in a very short amount of time and with little or no technical expertise, and the like. Any other suitable types of fittings, tubing, clasps, or catches, and the like, can be employed for attaching the pumps 108 and 120 to the tubing 500 without tools, and the like.

Figure 6:
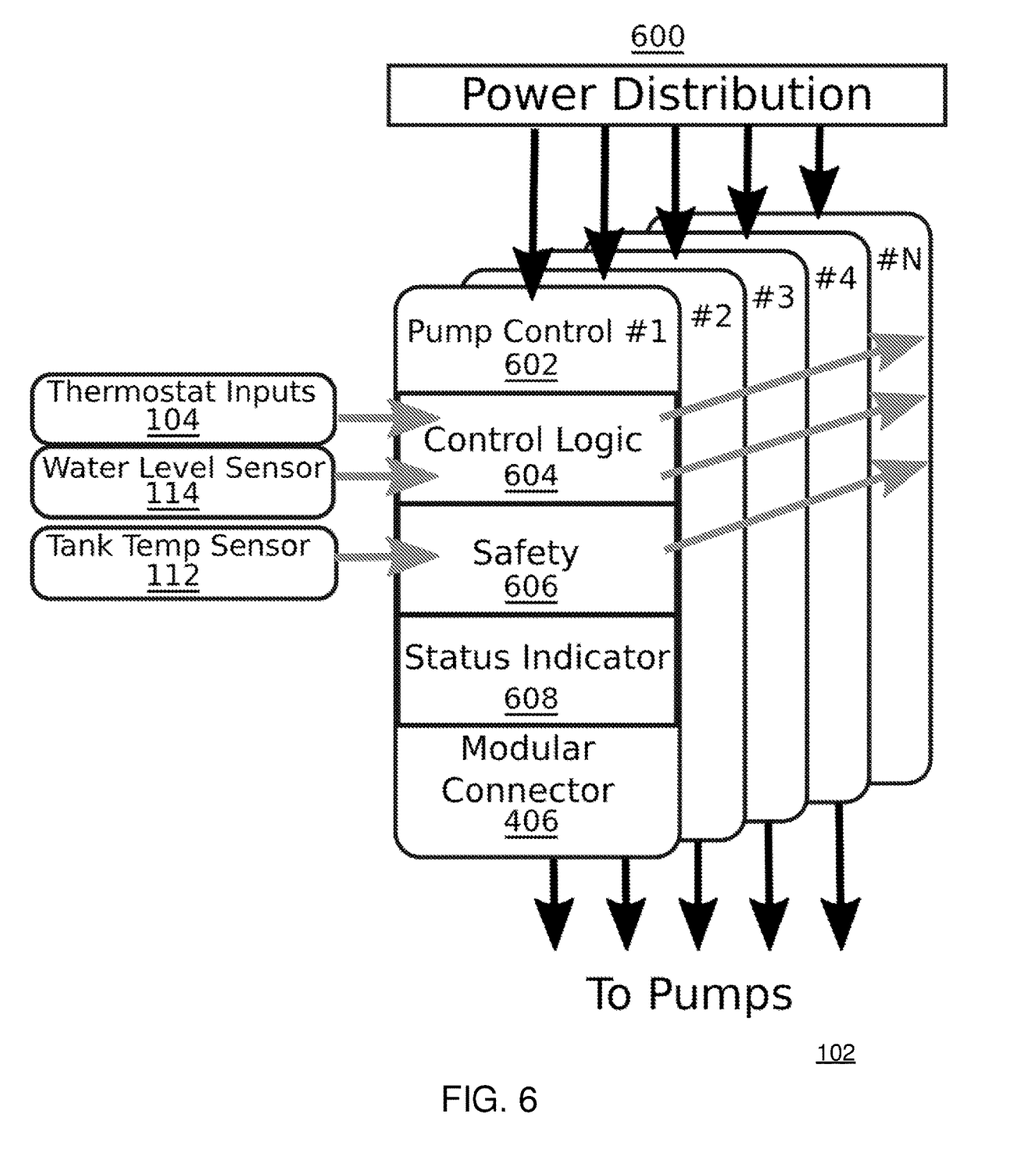
FIG. 6 is illustrative of a functional block diagram of a control system employed in the system of FIGS. 1-5.

FIG. 6 is illustrative of a functional block diagram of the control system 102 employed in the system of FIGS. 1-5. In FIG. 6, the control system 102 distributes power to the pumps 108 and 120, allows for various configuration settings, receives inputs from the thermostats 104 and sensors 112 and 114, turns the pumps 108 and 120 on and off at appropriate times, and displays status feedback for monitoring and diagnostics, and the like. Such tasks are accomplished with a control architecture in which the electrical power is distributed to multiple pump control units 602 via a power distribution circuit 600. Each of the pump control units 602 receives as inputs the signals from one or more of the thermostats 104, the water level sensor 114 within the water tank 118, and the tank 118 temperature sensor 112. The inputs and configuration settings are processed using suitable control logic 604 and safety check logic 606 to decide whether one or more of the pumps 108 and 120 should be turned on or off, and the like. The safety logic 606 can also include over-current protection mechanisms, such as a fuse of a circuit breaker, and the like. The status of the pumps 108 and 120 and suitable diagnostic information is then displayed for each of the pumps 108 and 120 in a status indicator 608 thereof, and the like. The status indicator 608 can include LED indicator lamps, audio notifications, multi-character screens, computer screen notifications, messages sent remotely via wires, radio, or internet, and the like. The modular connector 406 can be employed so that the pumps 108 and 120 can be electrically and removably connected to the control system 102, and the like. Advantageously, the above and various other control functions can be accomplished with any suitable analog circuitry, microcontrollers, computing devices, combination thereof, and the like.

Figure 7:
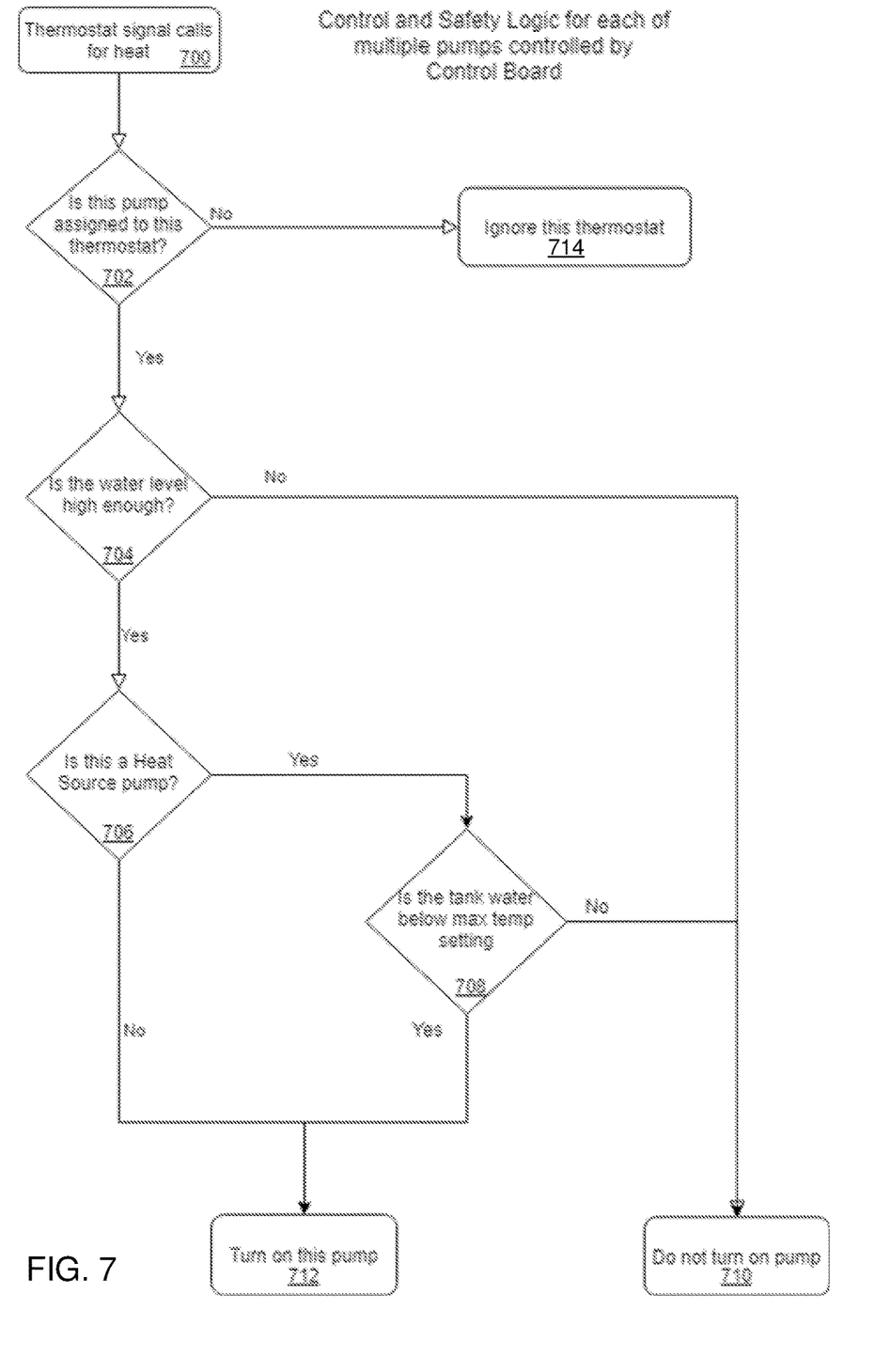
FIG. 7 is illustrative of control logic employed in the control system of FIG. 6.

FIG. 7 is illustrative of control logic employed in the control system 102 of FIG. 6. In FIG. 7, the multiple thermostats 104 or similar temperature control signals can be connected to and configured with the control system 102. For example, when one of the thermostats 104 signals for heat at step 700, the control system 102 can decide which of the pumps 108 and 120 are to be turned on. For each of the pumps 108 and 120, the control logic evaluates whether the respective pump 108 or 120 is assigned to the respective thermostat at step 702. If the respective pump 108 or 120 is not configured for this thermostat, then the input is ignored and the pump status is not changed at step 714, and otherwise control transfers to step 704, where a decision is made based on a signal from the sensor 114, as to whether or not the water level is high enough in the tank 118. If there is not enough water in the tank 118, the respective pump 108 and 120 is not allowed to turn on at step 710, and otherwise control transfers to step 706. Advantageously, this protects the pumps 108 and 120 from running dry which may cause them to fail. At step 706, the logic examines the configuration to determine if the respective pump 108 and 120 is the heat source pump 120. If the respective pump 108 and 120 is not the heat source pump 120, then the respective pump 108 is turned on at step 712. If step 706 determines the respective pump 108 and 120 is the heat source pump 120, then at step 708 the logic determines whether or not the tank 118 is at its maximum temperature set point. If the pump 108 and 120 is the heat source pump 120, and the tank 118 is below the maximum temperature setting, as determined in steps 706 and 708, then the pump 120 is turned on at step 712, otherwise it is not turned on at step 714, completing the process.

Accordingly, the novel heat distribution system can include a tank containing heat transfer fluid, and one or more pumps inside the tank, connecting to one or more heat load loops. The loops return fluid to the tank. The system also includes one or more pumps connected to one or more heat source loops. The loops return fluid to the tank. The pumps can be submersible. The pumps are able to be replaced with bare hands and no tools. The employed electronics also are able to be replaced with bare hands and no tools. A device is provided to physically access the pumps with bare hands. A device to prevent or reduce evaporation of transfer fluid are also employed. The tank can operate at atmospheric pressure. Devices are provided to assure that a heat source pump intake comes substantially from a heat load return fluid. A device to disburse and mix the return flows from loops, such that the heat load pumps, and all intake fluid at similar temperatures are provided, as well as a devices to sense low fluid levels, tank fluid temperature, and to automatically disable the pumps if the fluid level is low. Electrical power to the pumps can be less than 20 volts DC or AC, as needed. A submersed heat source can be provided in the tank to heat transfer fluid. A heat exchanger can be submersed in the heat transfer fluid. Devices are provided to limit the tank fluid temperature, adjust the speed of the pumps, and to functionally assign specific pumps to specific temperature sensing or control inputs (e.g., heating zones, etc.).

Although the system and method are described in terms of employing submersible pumps, non-submersible pumps can also be employed, based on the teachings of the present disclosure, as would be appreciated by one of ordinary skill in the relevant art(s).

The above-described devices and subsystems of the illustrative embodiments can include, for example, any suitable circuits, servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more circuits and/or programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present disclosures. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present disclosures, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present disclosures can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present disclosures for performing all or a portion (if processing is distributed) of the processing performed in implementing the disclosures. Computer code devices of the illustrative embodiments of the present disclosures can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present disclosures can be distributed for better performance, reliability, cost, and the like.

As stated above, the devices and subsystems of the illustrative embodiments can include computer readable medium or memories for holding instructions programmed according to the teachings of the present disclosures and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present disclosures have been described in connection with a number of illustrative embodiments, and implementations, the present disclosures are not so limited, but rather cover various modifications, and equivalent arrangements, which fall within the purview of appended claims.

What is claimed is:

1. A heat distribution system, comprising:
an unpressurized tank configured for holding a heat transfer fluid; and
one or more submersible heat transfer fluid pumps configured to pump the heat transfer fluid to one or more heat load loops respectively connected to the one or more heat transfer fluid pumps,
wherein the unpressurized tank is partitioned to have a first section for receiving return flow of the heat transfer fluid from the one or more heat load loops, and a second section for transferring the return flow of the heat transfer fluid to the one or more heat transfer fluid pumps.

2. The system of claim 1, further comprising:
control logic configured to control the one or more heat transfer fluid pumps based on programmable parameters.

3. The system of claim 2, wherein the programmable parameters include at least one of speed control of the one or more heat transfer fluid pumps, on off operation of the one or more heat transfer fluid pumps based on a temperature of the heat transfer fluid, and on off operation of the one or more heat transfer fluid pumps based on respective thermostat input.

4. The system of claim 1, further comprising:
mechanisms to limit evaporation of the heat transfer fluid, including at least one of a tank lid, water tight gaskets and fittings, and a low vapor oil layer over the heat transfer fluid.

5. The system of claim 1, further comprising:
one or more partitions in the unpressurized tank configured to ensure that return flow of the heat transfer fluid from the one or more heat load loops is mixed with the heat transfer fluid returning from a heat source before being available for the heat transfer fluid pumps configured to pump the heat transfer fluid to the one or more heat load loops.

6. The system of claim 1, further comprising:
a submersible heating element or heat exchanger disposed within the unpressurized tank.

7. The system of claim 2, wherein the one or more heat transfer fluid pumps, and the control logic are hand replaceable.

8. A method for heat distribution, comprising:
holding in an unpressurized tank a heat transfer fluid; and
pumping with one or more submersible heat transfer fluid pumps the heat transfer fluid to one or more heat load loops respectively connected to the one or more heat transfer fluid pumps,
wherein the unpressurized tank is partitioned to have a first section for receiving return flow of the heat transfer fluid from the one or more heat load loops, and a second section for transferring the return flow of the heat transfer fluid to the one or more heat transfer fluid pumps.

9. A computer program product for heat distribution and including one or more computer readable instructions embedded on a tangible, non-transitory computer readable medium and configured to cause one or more computer processors to perform the steps of:
holding in an unpressurized tank a heat transfer fluid; and
pumping with one or more submersible heat transfer fluid pumps the heat transfer fluid to one or more heat load loops respectively connected to the one or more heat transfer fluid pumps,
wherein the unpressurized tank is partitioned to have a first section for receiving return flow of the heat transfer fluid from the one or more heat load loops, and a second section for transferring the return flow of the heat transfer fluid to the one or more heat transfer fluid pumps.

10. The method of claim 8, further comprising:
controlling with control logic the one or more heat transfer fluid pumps based on programmable parameters.

11. The method of claim 10, wherein the programmable parameters include at least one of speed control of the one or more heat transfer fluid pumps, on off operation of the one or more heat transfer fluid pumps based on a temperature of the heat transfer fluid, and on off operation of the one or more heat transfer fluid pumps based on respective thermostat input.

12. The method of claim 8, further comprising:
limiting evaporation of the heat transfer fluid with at least one of a tank lid, water tight gaskets and fittings, and a low vapor oil layer over the heat transfer fluid.

13. The method of claim 8, further comprising:
ensuring with one or more partitions in the unpressurized tank that return flow of the heat transfer fluid from the one or more heat load loops is mixed with the heat transfer fluid returning from a heat source before being available for the heat transfer fluid pumps configured to pump the heat transfer fluid to the one or more heat load loops.

14. The computer program product of claim 9, further comprising:
controlling with control logic the one or more heat transfer fluid pumps based on programmable parameters.

15. The computer program product of claim 14, wherein the programmable parameters include at least one of speed control of the one or more heat transfer fluid pumps, on off operation of the one or more heat transfer fluid pumps based on a temperature of the heat transfer fluid, and on off operation of the one or more heat transfer fluid pumps based on respective thermostat input.

16. The computer program product of claim 9, further comprising:
limiting evaporation of the heat transfer fluid with at least one of a tank lid, water tight gaskets and fittings, and a low vapor oil layer over the heat transfer fluid.

17. The computer program product of claim 9, further comprising:
ensuring with one or more partitions in the unpressurized tank that return flow of the heat transfer fluid from the one or more heat load loops is mixed with the heat transfer fluid returning from a heat source before being available for the heat transfer fluid pumps configured to pump the heat transfer fluid to the one or more heat load loops.

* * * * *